US011939995B1

(12) United States Patent
Bueno Espinal

(10) Patent No.: US 11,939,995 B1
(45) Date of Patent: Mar. 26, 2024

(54) CONTROLLING MULTIPLE EVERSION-BASED ACTUATORS

(71) Applicant: Electronics for Imaging, Inc., Fremont, CA (US)

(72) Inventor: Eduardo Bueno Espinal, Almazora (ES)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

(21) Appl. No.: 18/158,071

(22) Filed: Jan. 23, 2023

(51) Int. Cl.
*F15B 15/10* (2006.01)

(52) U.S. Cl.
CPC ........ *F15B 15/103* (2013.01); *F15B 2215/30* (2013.01)

(58) Field of Classification Search
CPC ............................... F01B 19/04; F15B 15/103
See application file for complete search history.

(56) References Cited

U.S. PATENT DOCUMENTS

| | | | |
|---|---|---|---|
| 4,778,553 A | 10/1988 | Wood | |
| 10,954,789 B2 | 3/2021 | Hawkes et al. | |
| 2019/0217908 A1* | 7/2019 | Hawkes | F01B 19/04 |

* cited by examiner

*Primary Examiner* — Michael Leslie
*Assistant Examiner* — Daniel S Collins
(74) *Attorney, Agent, or Firm* — Perkins Coie LLP

(57) ABSTRACT

Disclosed here is a system and method to control multiple eversion-based actuators using a single motor, or no motor, thereby reducing the size and cost of the multiple eversion-based actuators. An activation mechanism can include a motor rotating in an expansion direction, rotating shaft, clutch, brake, pressure source under high pressure, and/or valve. The activation mechanism can cause the actuators including a wound reel of material to unwind and lengthen. A retraction mechanism can include a motor rotating in a contraction direction opposite the expansion direction, rotating shaft, clutch, pressure source having low pressure, valve associated with the pressure source, and/or the passive retraction system. The retraction mechanism can cause the actuators to rewind and shorten.

20 Claims, 9 Drawing Sheets

CONTROLLING MULTIPLE EVERSION-BASED ACTUATORS

TECHNICAL FIELD

The present application is related to eversion-based actuators, and more specifically to methods and systems that control multiple eversion-based actuators.

BACKGROUND

A linear actuator is an actuator that creates motion in a straight line, in contrast to the circular motion of a conventional electric motor. Linear actuators are used in machine tools and industrial machinery, in computer peripherals such as disk drives and printers, in valves and dampers, and in many other places where linear motion is required. Linear actuators can be employed in standalone fashion, thus increasing size and cost of the apparatus when multiple linear actuators need to be employed.

SUMMARY

Disclosed here is a system and method to control multiple eversion-based actuators using a single motor, or no motor, thereby reducing the size and cost of the multiple eversion-based actuators. An activation mechanism can include a motor rotating in an expansion direction, rotating shaft, clutch, brake, pressure source under high pressure, and/or valve. The activation mechanism can cause the actuators including a wound reel of material to unwind and lengthen. A retraction mechanism can include a motor rotating in a contraction direction opposite the expansion direction, rotating shaft, clutch, pressure source having low pressure, valve associated with the pressure source, and/or the passive retraction system. The retraction mechanism can cause the actuators to rewind and shorten.

DETAILED DESCRIPTION

Disclosed here is a system and method to control multiple eversion-based actuators using a single motor, or no motor, thereby reducing the size and cost of the multiple eversion-based actuators. An activation mechanism can include a motor rotating in an expansion direction, rotating shaft, clutch, brake, pressure source under high pressure, and/or valve. The activation mechanism can cause the actuators including a wound reel of material to unwind and lengthen. A retraction mechanism can include a motor rotating in a contraction direction opposite the expansion direction, rotating shaft, clutch, pressure source having low pressure, valve associated with the pressure source, and/or the passive retraction system. The retraction mechanism can cause the actuators to rewind and shorten.

Controlling Multiple Eversion-Based Actuators

Figure 1A:
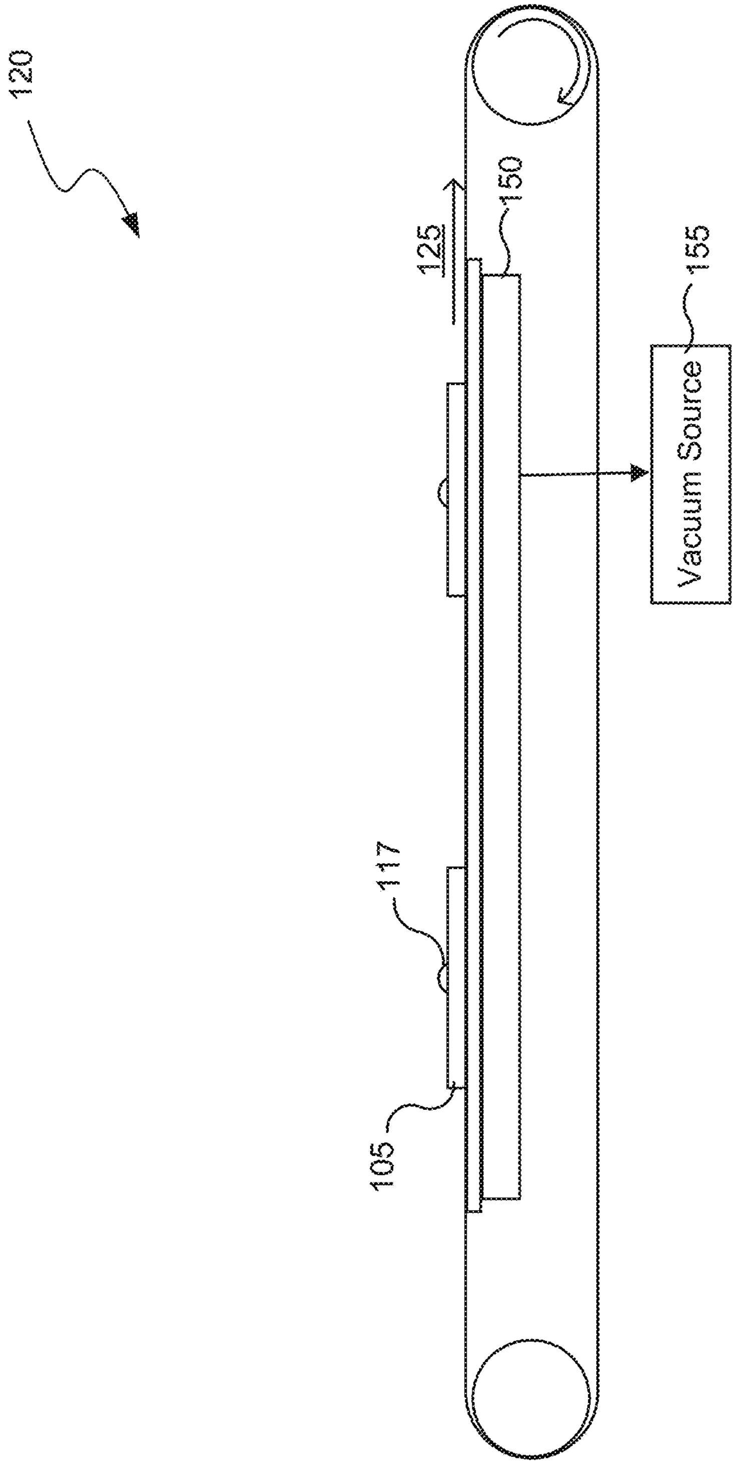
FIG. 1A shows the side view of a vacuum table conveyor.

FIG. 1A shows the side view of a vacuum table conveyor. The vacuum table conveyor ("vacuum table") 120 supports a substrate 105, traveling in a predetermined direction 125. The substrate 105 can be a canvas receiving printing material 117, such as ink. The vacuum table 120 includes a vacuum source, e.g. a centrifugal blower, 155 and a vacuum chamber 150 that secure and flatten the substrate 105 against the vacuum table by creating a downward pressure on the substrate.

Figure 1B:
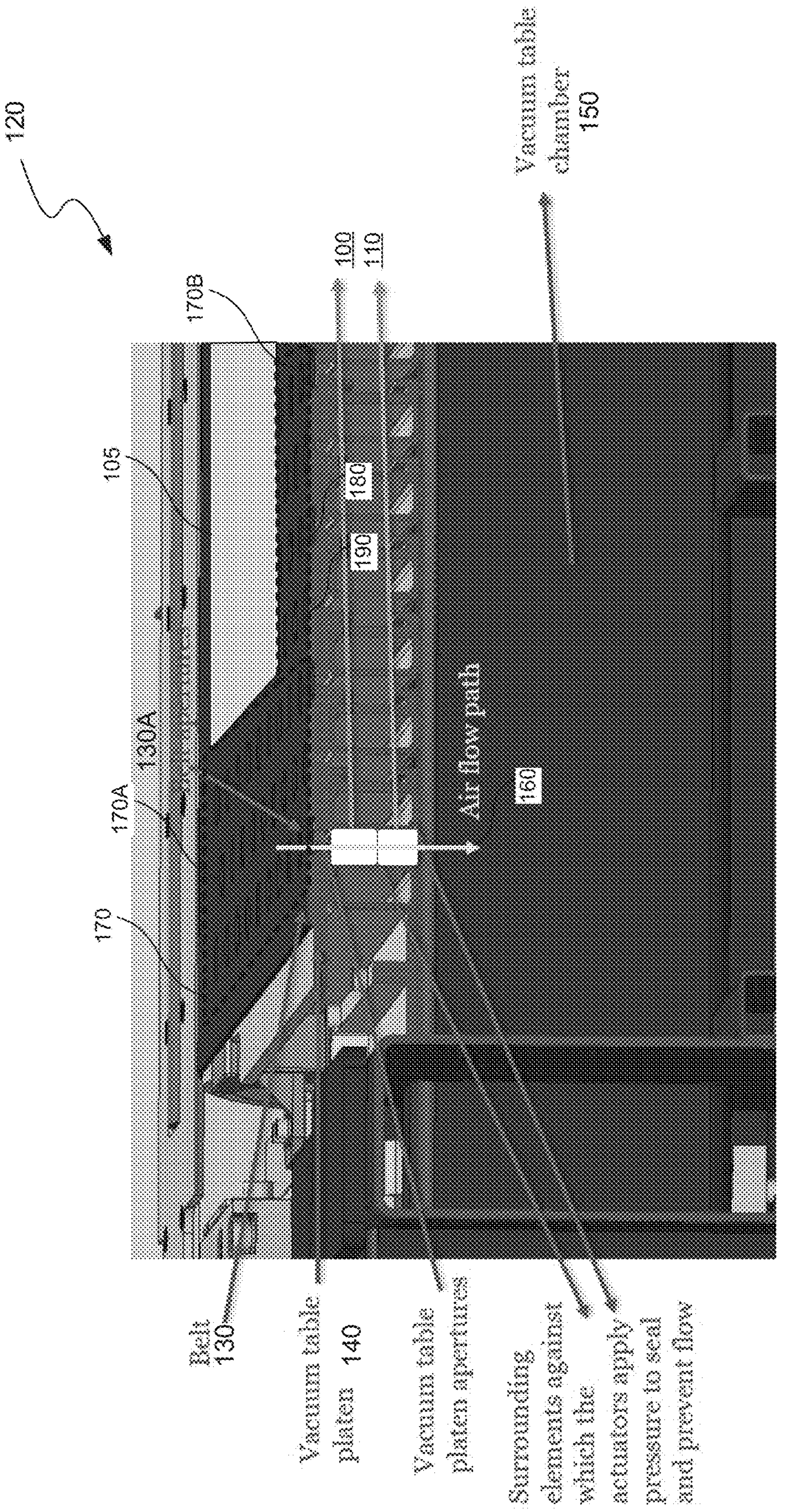
FIG. 1B shows a three-quarters view of the vacuum table conveyor using an array of actuators.

FIG. 1B shows a three-quarters view of the vacuum table conveyor using an array of actuators. The array, e.g., plurality or multiplicity, of actuators, such as an array of eversion-based actuators, can include actuators 100, 110, which can be controlled simultaneously using the disclosed technology. The vacuum table 120 can flatten, secure, and convey materials, such as a substrate 105, to ensure that the material carried by the vacuum table 120 is not affected by material warp or uncontrolled motion. One common use of the vacuum table 120 is in inkjet digital printing, where the non-contact nature of the ink deposition method and the required precision levels impose severe requirements in terms of substrate flatness and motion accuracy.

A perforated belt 130 is positioned on top of a vacuum table platen 140. The perforated belt 130 has apertures 130A (only one labeled for brevity), disposed in longitudinal rows, that create a connection between the interior of the vacuum table chamber 150 and the substrate 105, thereby allowing the generation of adhesion forces between the substrate 105 and the perforated belt 130. These adhesion forces are the result of the depression within the vacuum table chamber 150 caused by the air flow 160 through the apertures 130A in the perforated belt 130 and the vacuum table chamber. The air flow 160 can be induced by an industrial fan.

For optimum operation, reducing the vacuum conveyor leakage area 170, the region not covered by the substrate 105 to be conveyed, is the most important aspect as high leakage conditions result in reduced depression and, consequently, reduced substrate flattening performance and inefficient usage of the fan power. The challenge is adapting to the vacuum table 120 opening along the transverse axis, in the area 170A, due to the width of the substrate 105 being smaller than the width of the vacuum table 120, and along the longitudinal axis, in the area 170B, due to insufficient number of substrates to cover the whole length of the vacuum table 120.

In this context, an array of eversion-based actuators 100, 110 can be positioned aligned with the longitudinal rows of apertures 180, 190 of the vacuum table 120. The eversion-based actuators 100, 110 can extend in and out of the longitudinal rows 180, 190. By extending to partially or fully close a longitudinal row of apertures 180, 190, the eversion-based actuators 100, 110 can open or close the whole length or a portion of a given longitudinal row of apertures 180, 190. In such a way it is possible to block the flow through the portion of the vacuum table area 170A that is wider than the substrate width and the regions 170B not covered by substrate.

One inconvenience of this array of eversion-based actuators aligned with the rows of apertures 180, 190 of the vacuum table 120 is that the number of required actuators 100, 110 is equal to the number of rows of apertures of the vacuum table. Typically, a vacuum table 120 maximizes the number of rows 180, 190 per unit width of the vacuum table 120 to maximize its effectiveness, but this has negative implications on the cost of a system having an actuator 100, 110 for each row of apertures 180, 190 of the vacuum table 120. The disclosed technology provides methods to mechanically multiplex the actuation of multiple eversion-based actuators 100, 110 in order to reduce the cost and complexity implications of increasing the number of actuators.

Most of the cost of an eversion-based actuator 100, 110 is related to the cost of the motor and motor driver that controls the extension and retraction of the reel of material, as explained in this application. In the case of a standard array of actuators, the cost gets multiplied by the number of actuators. Thus, the key factor to reduce cost and complexity of actuators 100, 110 is to reduce the number of motors required. The disclosed technology proposes different embodiments to achieve controllability of the array of actuators 100, 110 while reducing the number of motors required and achieving control of the rotational motion with cheaper actuators.

In addition to the actuators 100, 110 being used in the context of a vacuum table 120, the eversion-based actuators can be applied in trenchless repair of pipes. In this application, an eversion-based actuator applies a liner in the interior of the damaged pipe to cover the cracks and leaks present. The eversion-based actuators 100, 110 can be used to create a robot that can respond to its environment and modify its trajectory accordingly. A highly valuable characteristic of the actuators 100, 110 is the capability to reliably navigate tight and unknown spaces.

Figure 2A:
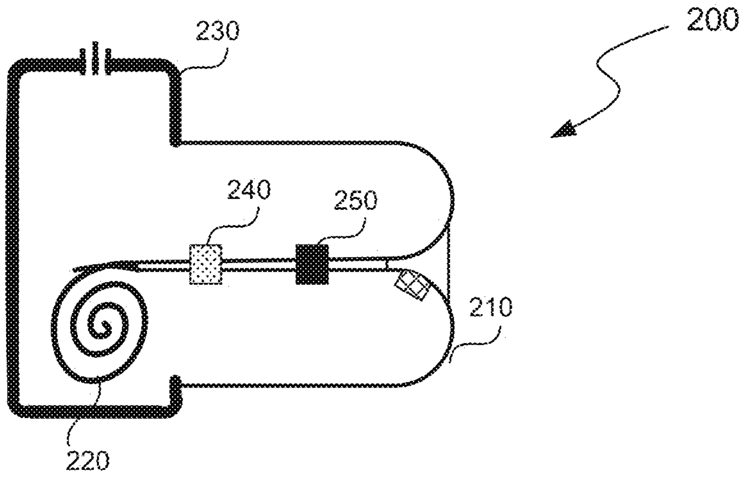
FIGS. 2A-2C show operation of an eversion-based actuator.
Figure 2B:
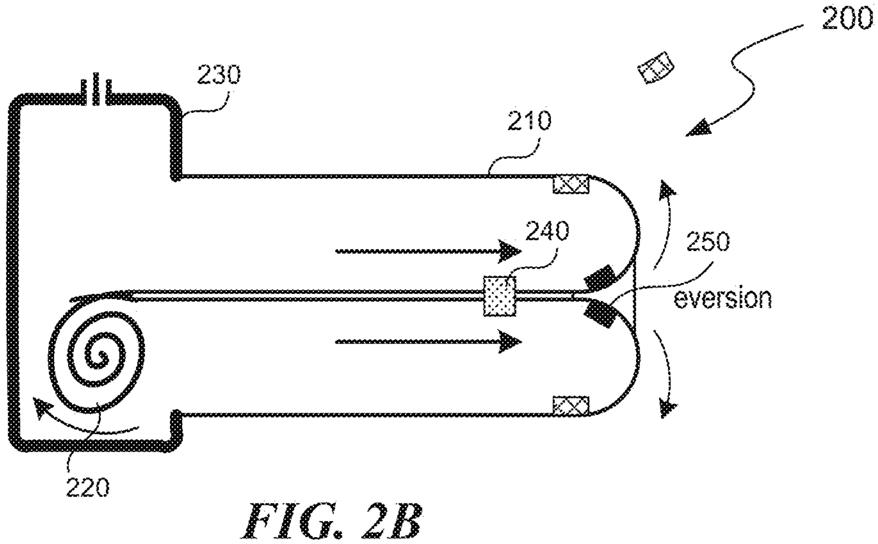
Figure 2C:
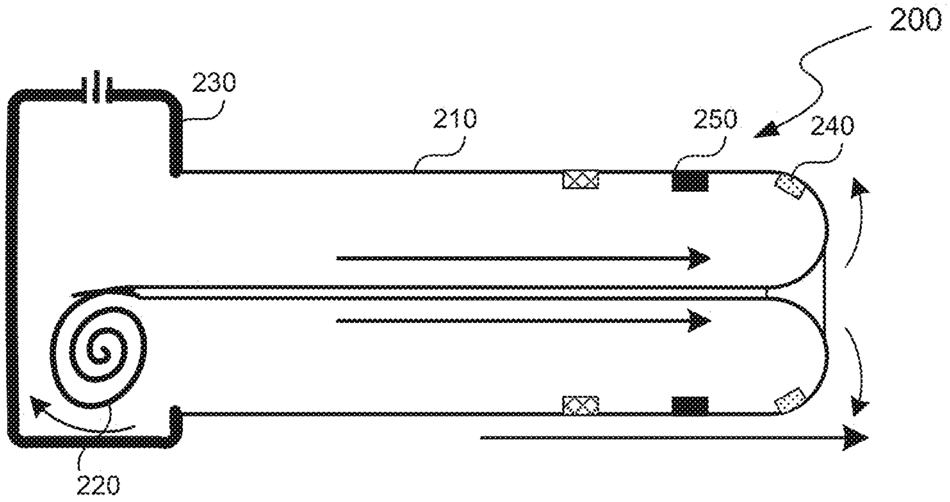

FIGS. 2A-2C show operation of an eversion-based actuator. The eversion-based actuator 200 is a soft linear actuator where the motion is accomplished by turning inside out (everting), through the action of fluid pressure, a tubular bladder 210 made out of thin, inextensible and non-porous material. The bladder material is typically stored in a pulley or reel of material 220 within a pressurized chamber 230. The reel of material 220 can be unwound under fluid pressure, thus increasing the length of the actuator 200. The extension and retraction of the reel of material 220 and the actuator 200 can be controlled by controlling the rotation of the reel of material either manually or through a motor. The actuator 200 has many inherent benefits over alternative linear actuation technologies, such as: 1) the actuator can be constructed from very cheap off-the-shelf materials, 2) the actuator's flexibility provides inherent sealing capabilities along the whole length of the actuator, 3) the actuator does not have a rigid shape, so it is able to easily adapt to different environments, 4) the actuator can reliably navigate spaces smaller than the cross-section of the tubular bladder 210 because the actuator is flexible and can compress to a smaller cross-section than the cross-section of the tubular bladder, and 5) the ratio between the fully extended and fully retracted length of the actuator can be made as large as desired.

Figure 3:
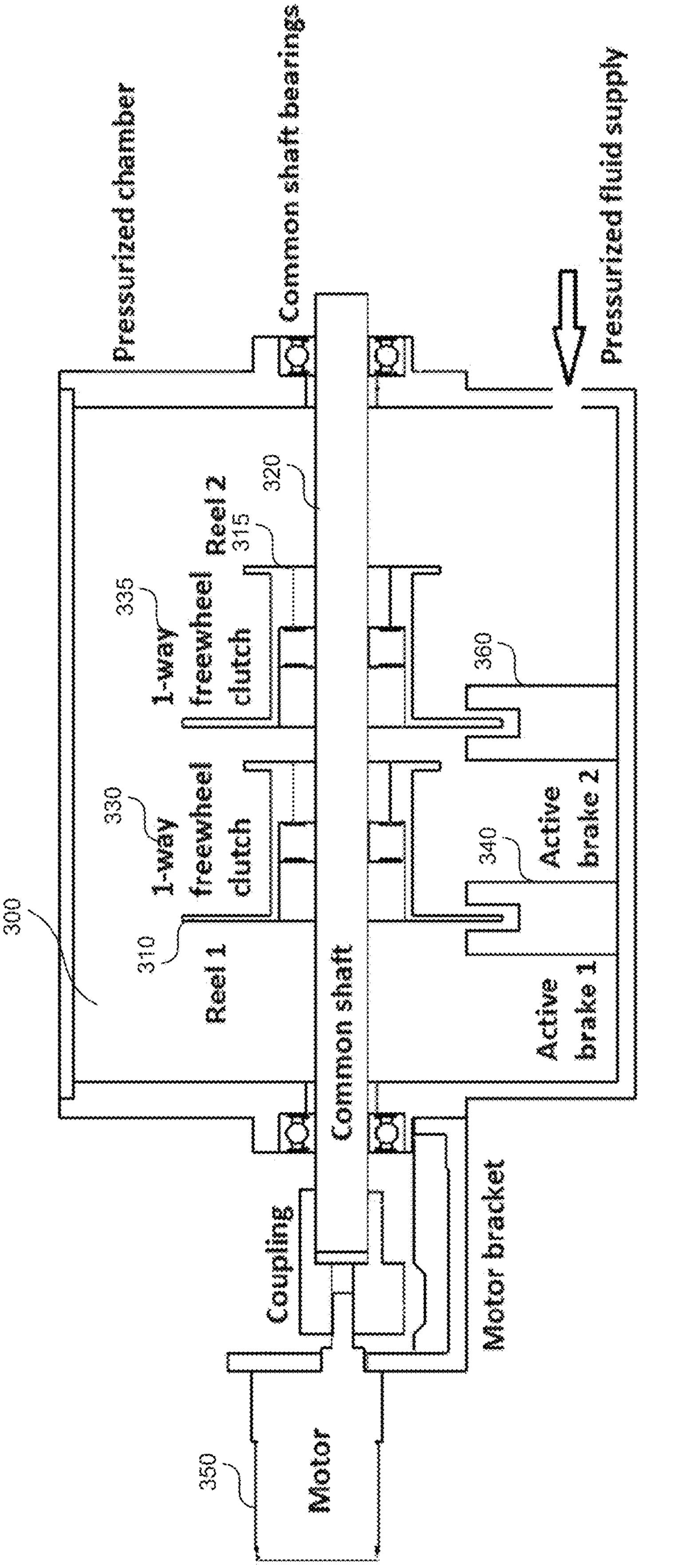
FIG. 3 shows a system to control an array of eversion-based actuators, according to one embodiment.

The tubular bladder 210 can include markings 240, 250, which can indicate the length of the actuator 200. The length of the actuator 200 can be measured and controlled by a processor, as described in this application FIG. 3 shows a system to control an array of eversion-based actuators, according to one embodiment. The first embodiment involves mounting, within a single pressurized chamber 300, the different reels of material/pulleys 310, 315 on a common shaft 320 with a one-way freewheel clutch mechanism 330, 335 that allows relative rotation of the shaft with respect to the reel of material only in the direction that causes actuator expansion. The rotation of this shaft 320 is controlled by a single motor 350. Some examples of suitable one-way freewheel clutch mechanisms include the pawl-ratchet mechanism, the axial ratchet mechanism, the sprag clutch, and the cam clutch. Additionally, an active brake 340 per actuator is required to selectively prevent the rotation of the reel of material 310 by coupling the reel of material with a stationary component, e.g. the pressurized chamber. In this embodiment, the reel of material 310 locked by the active brake 340 remains stationary while the reel of material 315 rotates according to the rotation of the common shaft 320.

In this embodiment, the retraction motion has to be the same for all the actuators and cannot be controlled with the active brakes. For example, this means that if the reel of material 310 is extended to a length of 10 cm, but the reel of material 315 is extended to a shorter length, such as 0 cm, the lengths of the two reels of material 310, 315 need to be evened out, prior to fully retracting the reels of material. One way to do this is to engage the brake 340 of the reel of material 310 to block further extension of the reel of material 310, while at the same time disengaging the brake 360 of the reel of material 315 to enable further extension of the reel of material 315. Once the length of the reel of material 315 matches the length of the reel of material 310, the system can disengage the brake 360, and rotate the shaft in a direction in which the two reels of material 310, 315 contract, e.g., shorten.

In this embodiment, the actuator can include the reel of material 310, the clutch 330, and the brake 340. The activation mechanism of the actuator can include the motor 350, the shaft 320 rotating in the expansion direction, the clutch, and the brake when disengaged. The retraction mechanism of the actuator can include the motor 350, the shaft 320 rotating in the contraction direction, and the clutch.

Figure 4:
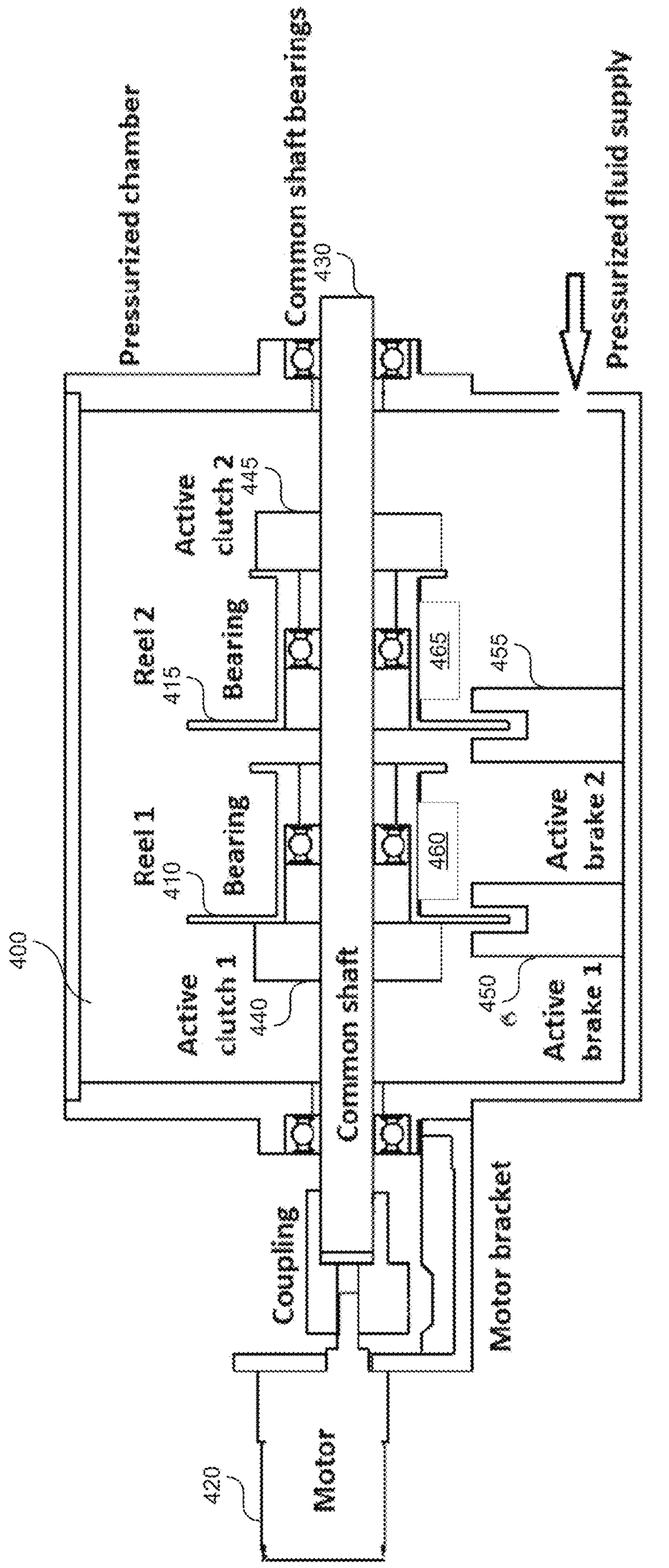
FIG. 4 shows a system to control an array of eversion-based actuators, according to another embodiment.

FIG. 4 shows a system to control an array of eversion-based actuators, according to another embodiment. The second embodiment involves mounting, within a single pressurized chamber 400, the different reels of material/pulleys 410, 415 with bearings on a common shaft 430. The rotation of this shaft 430 is controlled by a single motor 420. To rotate or block each of the reels of material 410, 415, one active clutch 440, 445 and one active brake 450, 455 per actuator are required. The active clutch 440, 445 couples the rotational motion of the reel of material 410, 415, respectively, and that of the common shaft 430. The active brake 450, 455 prevents the rotation of the reel of material 410, 415, respectively, by coupling the reel of material 410, 415 with a stationary component. In this embodiment, the reels of material 410, 415 either are locked by the active clutch 440, 445 to the common shaft 430 and move according to the rotation of the common shaft or are stationary and locked by the active brake 450, 455. This embodiment has the limitation that two additional actuators, e.g., the clutch actuator and the brake actuator, are required per reel of material 410, 415, so the minimum allowable spacing between eversion actuators is increased. In this embodiment, the eversion-based actuator can include the reel of material 410, the clutch 440, and the brake 450.

Optionally, a passive retraction mechanism 460, 465, such as a torsion spring, can be attached to each reel of material 410, 415, thus preventing the reel of material from extending in case both the active clutch 440, 445 and the brake 450, 455 are disengaged from the reel of material 410, 415.

In this embodiment, the actuator can include the reel of material 410, the clutch 440, and the brake 450. The activation mechanism of the actuator can include the motor 420, the shaft 430 rotating in the expansion direction, the clutch 440 when engaged, and the brake 450 when disengaged. The retraction mechanism of the actuator can include the motor 420, the shaft 430 rotating in the contraction direction, and the clutch 440.

The motion of the actuators described in this application can be controlled using a programmable logic controller (PLC), which includes a processor that can perform various calculations, such as measurement of the extension of the eversion-based actuator. In the embodiments shown in FIGS. 3 and 4, the processor can perform the measurement of the position of the actuator for closed-loop control by various main methods.

The first method involves measuring the rotation of the common shaft with a rotational encoder and determining from the measurement the longitudinal movement of the actuator using the reel of material diameter. The main problem of this method is that the diameter of the reel of material changes according to the actuator extension because there is less material on the reel of material as the actuator is extended. Consequently, the processor needs to implement a differential method to account for the varying reel of material diameter when estimating the length of the reel of material.

The second method involves using a volumetric flow meter to estimate the actuator position. This is accomplished by taking the flow meter reading (units of volume) between two positions, e.g., lengths, of the reel of material, and converting the flow meter readings into longitudinal movement of the actuator between the two positions of the reel of material. To calculate the difference in length between two positions of the reel of material, the processor can divide the volume by the cross-section area of the pressurized reel of material. If the pressurized chamber is used for multiple reels of material, the volume received by the pressurized chamber can be distributed among the multiple reels of material. To correctly compute the length of each reel of material, the processor can determine the number of reels of material that have expanded between position 1 and position 2. To determine the difference in length between position 1 and position 2 for each reel of material, the processor can divide the volume by the cross-section area of the pressurized reel of material, and further divide the volume by the number of reels of material that have expanded.

The third method involves using an optical sensor to record an image of the actuator in position 1 and position 2. The reel of material itself can have length markings. The processor can obtain the recorded images, and can read out the length markings from the images.

Figure 5:
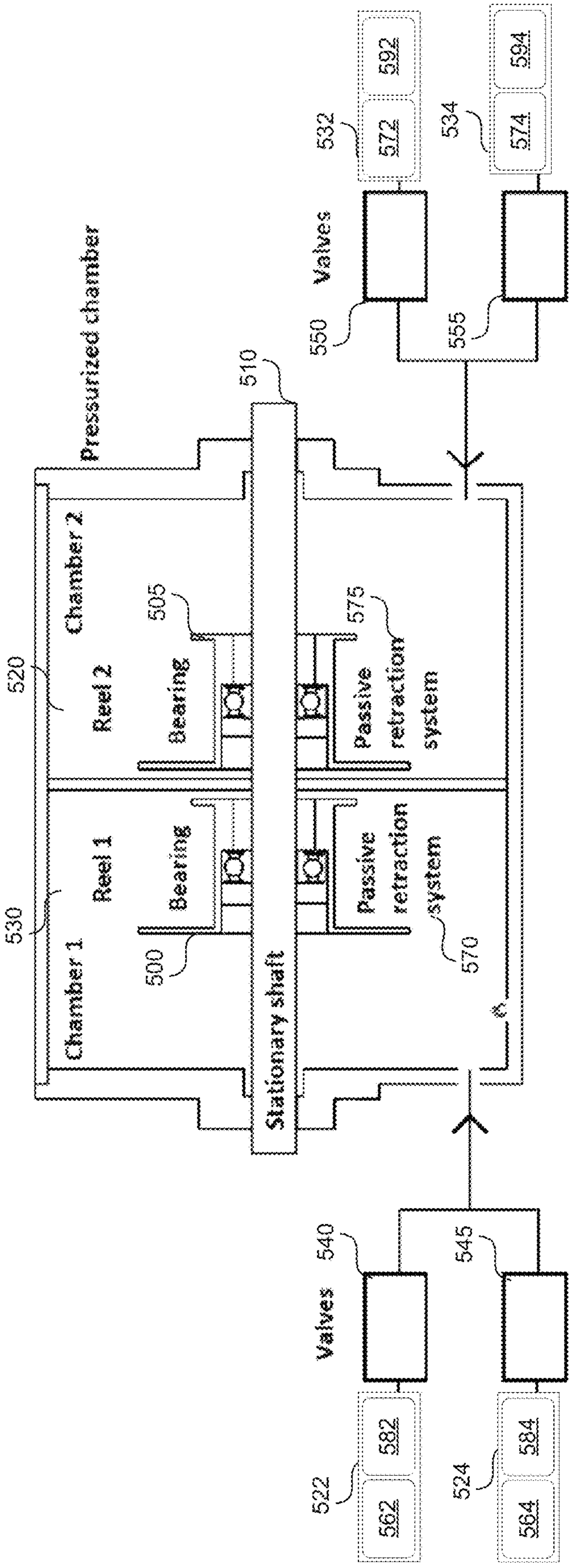
FIG. 5 shows a system to control an array of eversion-based actuators, according to a third embodiment.

FIG. 5 shows a system to control an array of eversion-based actuators, according to a third embodiment. The third embodiment involves mounting the different reels of material/pulleys 500, 505 with bearings on a common stationary shaft 510. Contrary to the previous two embodiments, different pressurized chambers 520, 530 are required for each actuator and no motor is required. Each of the chambers 520, 530 can be selectively connected to two different pressure sources 522, 524, 532, 534 (one pressure source 522, 532 with a higher pressure and another pressure source 524, 534 with a lower pressure) through the actuation of valves 540, 545, 550, 555. Each pressure source 522, 524, 532, 534 has a volumetric flow meter 562, 564, 572, 574 for deducing the actuator positions as described in this application. Each pressure source 522, 524, 532, 534 has a pressure regulator 582, 584, 592, 594 that allows the processor to estimate and perform closed-loop control of the actuation and retraction speeds of the actuators connected to them. The reels of material 500, 505 are coupled to the stationary shaft 510 or to any other stationary component through a passive retraction system 570, 575 like a torsion spring that allows retraction to be performed.

In this embodiment, the actuator can include the reel of material 500, the pressurized chamber 530, the pressure source 522, 524, and valves 540, 545. The activation mechanism of the actuator can include the pressure source 522 having the higher pressure, and the valve 540 associated with the pressure source 522. The retraction mechanism of the actuator can include the pressure source 524 having the lower pressure, the valve 545 associated with the pressure source 524, and the passive retraction system 570.

All the described embodiments provide reduced cost and complexity over having multiple standard actuators. For example, in the pipe lining application described above, using the disclosed embodiments provides a faster turnaround by processing multiple pipes at once, as opposed to processing one pipe at a time. For the robot application, collaborative operation between multiple actuators can be achieved. For any of the embodiments presented above, multiple arrays of eversion-based actuators can be combined to produce a two-dimensional array of actuators. The control of the extension of each of the actuators of this array allows the creation of arbitrary three-dimensional surfaces that can be useful in many applications. One of them is within the industry of manufacturing equipment, where this system would allow creation of reconfigurable mold systems for the manufacturing of parts out of foam, plastics, composites, and other materials.

Figure 6:
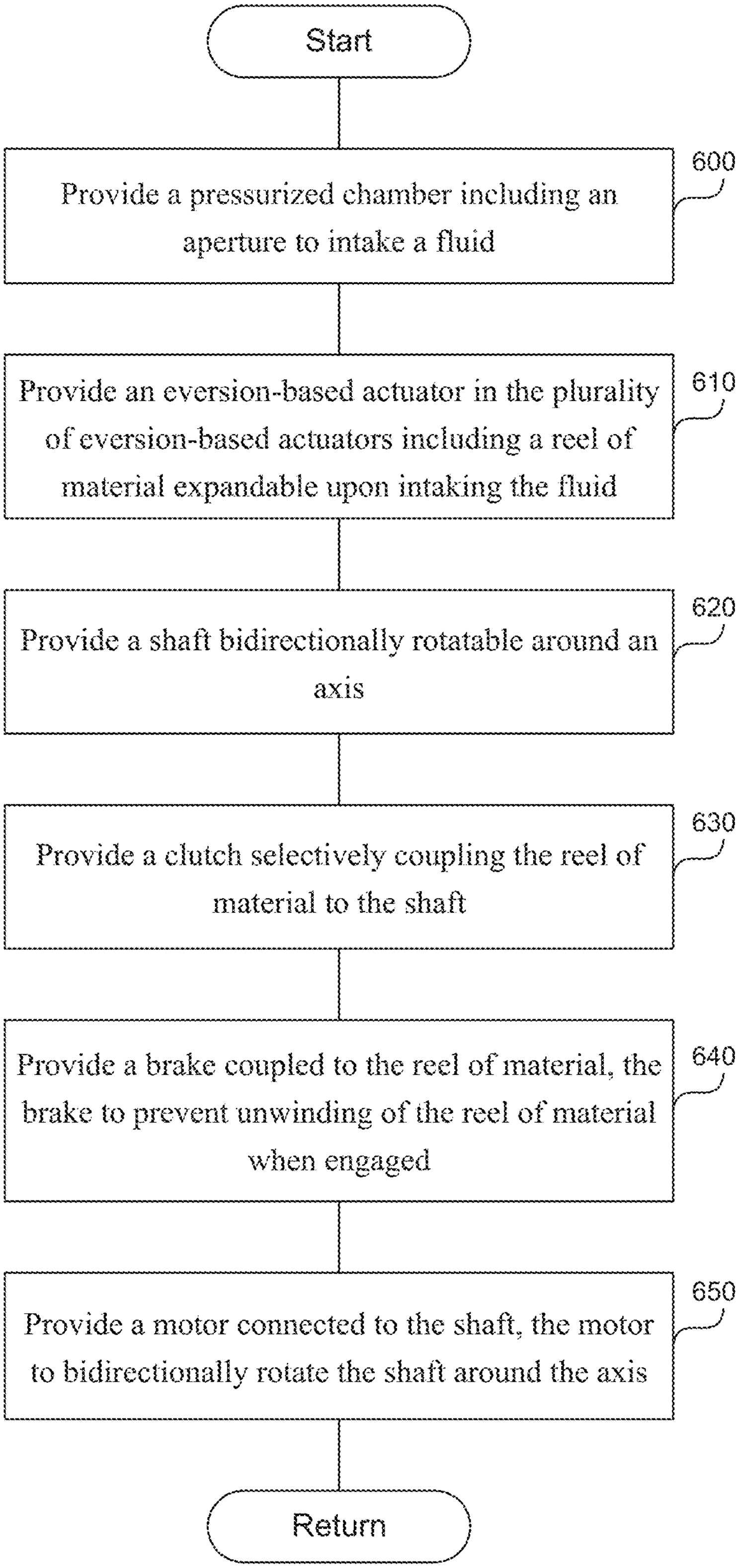
FIG. 6 is a flowchart of a method to control multiple eversion-based actuators according to one embodiment.

FIG. 6 is a flowchart of a method to control multiple eversion-based actuators according to one embodiment. In step 600, a pressurized chamber including an aperture to intake a fluid is provided. In step 610, an eversion-based actuator among the multiple eversion-based actuators is provided. An actuator can include a reel of material expandable upon intaking the fluid. The material can be flexible like a bladder.

In step 620, a shaft bidirectionally rotatable around an axis is provided. In step 630, a clutch selectively coupling the reel of material to the shaft is provided. In step 640, a brake coupled to the reel of material is provided. The brake can prevent unwinding of the reel of material when engaged.

In step 650, a motor connected to the shaft is provided. The motor can bidirectionally rotate the shaft around the axis. The motor can rotate the shaft in a first direction to simultaneously expand a first multiplicity of eversion-based actuators among the multiple eversion-based actuators. The operation of the clutch and operation of the brake can determine whether the eversion-based actuator expands with rotating the shaft in the first direction. For example, if the brake is engaged, the actuator does not expand even when the shaft is rotated in the first direction.

The motor can rotate the shaft in a second direction opposite the first direction to simultaneously contract a second multiplicity of eversion-based actuators among the multiple eversion-based actuators. The first multiplicity of eversion-based actuators and the second multiplicity of eversion-based actuators can be different, but can also be the same. For example, in the first embodiment described in this application, the clutch always retracts the reel of material when the shaft rotates in the retraction direction. In the second embodiment described in this application, the clutch needs to be engaged to retract the reel of material when the shaft rotates in the retraction direction.

In the first embodiment, the provided clutch rotationally couples the reel of material to the shaft when the shaft is rotated in the second direction. The provided clutch thereby contracts the reel of material when the shaft rotates in the second direction. The provided clutch rotationally couples the reel of material to the shaft when the shaft is rotated in the first direction, thereby expanding the reel of material when the shaft rotates in the first direction and the clutch rotationally couples the reel of material to the shaft. The provided brake can operate in a first mode and a second mode. The first mode can disengage the brake from the reel of material, allowing the reel of material to rotate with the shaft. The second mode can engage the brake with the reel of material, preventing the reel of material from rotating.

The system can include multiple actuators, such as a first actuator and a second actuator, activated using a single motor. However, the lengths of the first actuator and the second actuator can differ because the first brake of the first actuator can be engaged while the shaft is rotating, thus causing expansion of only the second actuator. In the end, the two actuators have different lengths. To retract the actuators to the initial position, a hardware or software processor can execute instructions described in this application. The processor can be a part of a PLC system. The processor can set the first brake in the second mode, thereby preventing the first reel of material from rotating with the shaft. The processor can set the second brake in the first mode, thereby enabling the second reel of material to rotate with the shaft. The processor can activate the motor to cause a rotation of the shaft in the first direction, thereby expanding the second actuator. The processor can set the first brake in the first mode, thereby enabling the reel of material to rotate with the shaft. The processor can set the second brake in the second mode, thereby preventing the second reel of material from rotating with the shaft. The processor can activate the motor to cause a rotation of the shaft in the first direction until a length of the first actuator matches a length of the second actuator. The processor can set the second brake in the first mode, thereby enabling the second reel of material to rotate with the shaft. The processor can activate the motor to cause a rotation of the shaft in the second direction, thereby contracting the first reel of material and the second reel of material.

In the second embodiment, the provided clutch and brake can operate in multiple modes including a first mode and a second mode. The first mode of the clutch can rotationally couple the reel of material to the shaft. The second mode of the clutch can decouple the reel of material from the shaft. The first mode of the brake can disengage the brake from the reel of material, allowing the reel of material to rotate. The second mode of the brake can engage the brake with the reel of material, preventing the reel of material from rotating. In addition, the processor can set the brake to operate in the second mode, thereby preventing the reel of material from rotating upon intaking the fluid, and cause the pressurized chamber to intake the fluid, causing other actuators to expand but not the actuators with the brake on.

The processor can measure the length of one or more of the eversion-based actuators. In one embodiment, to measure the length of the actuators, the processor can use a rotational encoder that can measure a rotation of the shaft. The processor can obtain an indication of the rotation of the shaft from the rotational encoder, and can obtain a diameter associated with the reel of material. The processor can determine a length of the eversion-based actuator based on the indication of the rotation of the shaft and the diameter associated with the reel of material.

In another embodiment, to measure the length of the actuators, the processor can use a volumetric flow meter that can measure a volume of fluid associated with the pressurized chamber. The processor can obtain an indication of the volume of fluid associated with the pressurized chamber, and can obtain a cross-section area associated with the reel of material. The processor can determine a length of the eversion-based actuator based on the cross-section area associated with the reel of material and an indication of the volume of fluid associated with the pressurized chamber. In addition, the processor can also take into account how many of the actuators are actually activated. Thus, to obtain the length of each actuator, the processor can divide the length obtained through division by the number of actuators that are activated.

In a third embodiment, to measure the length of the actuators, the processor can use optical sensors that can record an image associated with the eversion-based actuator. The processor can determine a length of the eversion-based actuator based on the recorded image. For example, the actuator can have length markings that can be recorded in the image. To determine the length of the actuator, the processor can analyze the image to extract the length markings.

Figure 7:
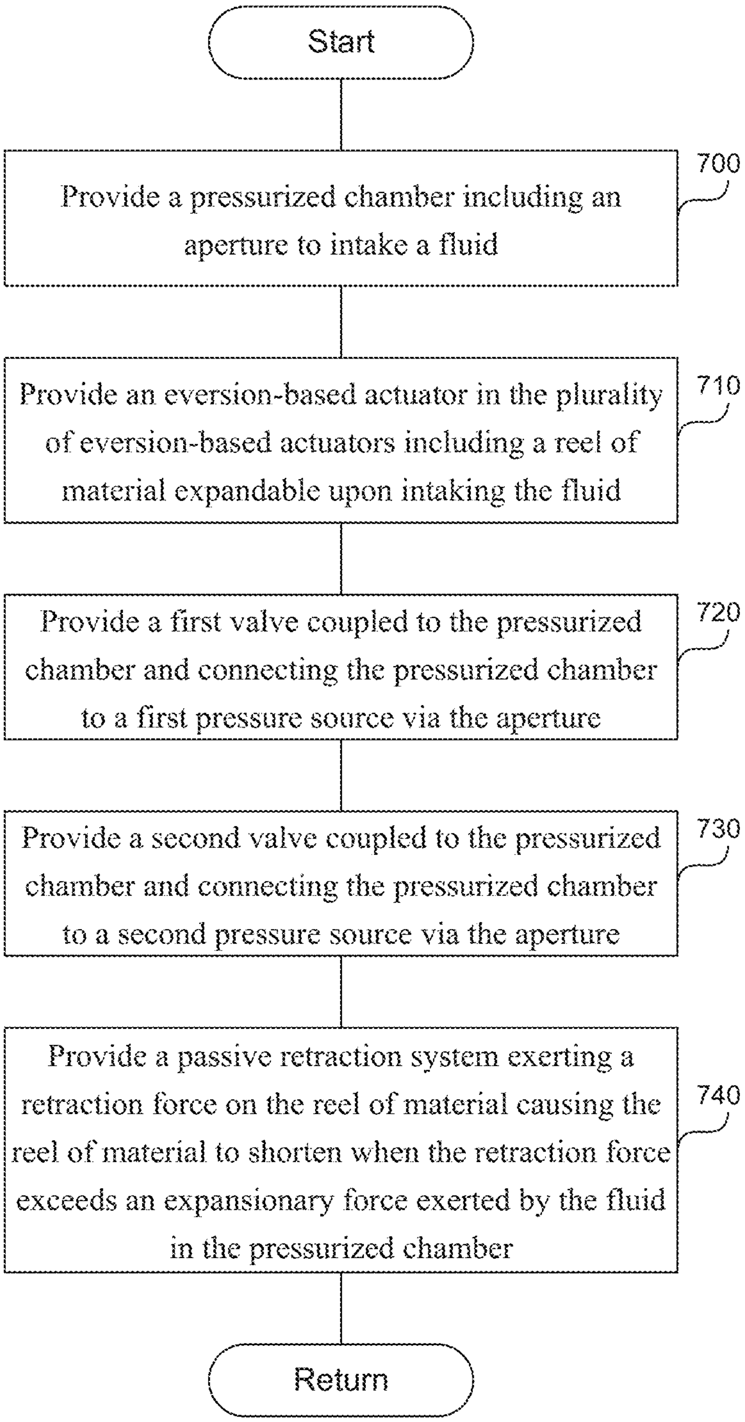
FIG. 7 is a flowchart of a method to control multiple eversion-based actuators according to another embodiment.

FIG. 7 is a flowchart of a method to control multiple eversion-based actuators according to another embodiment. In step 700, a pressurized chamber including an aperture to intake a fluid is provided. In step 710, an eversion-based actuator in the plurality of eversion-based actuators is provided. The eversion-based actuator can include a reel of material expandable upon intaking the fluid. The material can be flexible like a bladder.

In step 720, a first valve coupled to the pressurized chamber and connecting the pressurized chamber to a first pressure source via the aperture is provided. Upon activation, the first valve can enable intake of the fluid into the pressurized chamber.

In step 730, a second valve coupled to the pressurized chamber and connecting the pressurized chamber to a second pressure source via the aperture is provided. A pressure of the fluid in the first pressure source can exceed a pressure of the fluid in the second pressure source. Upon activation, the second valve can enable outflow of the fluid from the pressurized chamber.

In step 740, a passive retraction system exerting a retraction force on the reel of material is provided. The passive retraction system can cause the reel of material to shorten when the retraction force exceeds an expansionary force exerted by the fluid in the pressurized chamber. The passive retraction system can include a torsion spring or an angular spring.

A first pressure regulator associated with the first pressure source is provided. The first pressure regulator can estimate lengthening and shortening speed associated with the reel of material coupled to the first pressure regulator.

A volumetric flow meter to measure a volume of fluid associated with the pressurized chamber is provided. A hardware or software processor executing instructions in this application can obtain an indication of the volume of fluid associated with the pressurized chamber, and a cross-section area associated with the reel of material. The processor can determine a length of the eversion-based actuator based on the cross-section area associated with the reel of material and the indication of the volume of fluid associated with the pressurized chamber. In addition, the processor can obtain a number of actuators that are activated, and divide the length of the eversion-based actuator by the number of actuators that are activated.

A second pressurized chamber including a second aperture to intake a second fluid is provided. A second eversion-based actuator in the plurality of eversion-based actuators is provided. The second eversion-based actuator can include a second reel of material expandable upon intaking the second fluid. A third valve coupled to the second pressurized chamber and connecting the second pressurized chamber to a third pressure source via the second aperture is provided. Upon activation, the first valve can enable intake of the fluid into the pressurized chamber. A fourth valve coupled to the second pressurized chamber and connecting the second pressurized chamber to a fourth pressure source via the second aperture is provided. A pressure of the second fluid in the third pressure source can exceed a pressure of the second fluid in the fourth pressure source. Upon activation, the fourth valve can enable outflow of the second fluid from the second pressurized chamber. A second passive retraction system exerting a second retraction force on the second reel of material is provided. The second passive retraction system can cause the second reel of material to shorten when the second retraction force exceeds a second expansionary force exerted by the second fluid in the second pressurized chamber. A processor can independently control lengthening and shortening of the reel of material and lengthening and shortening of the second reel of material.

Computer

Figure 8:
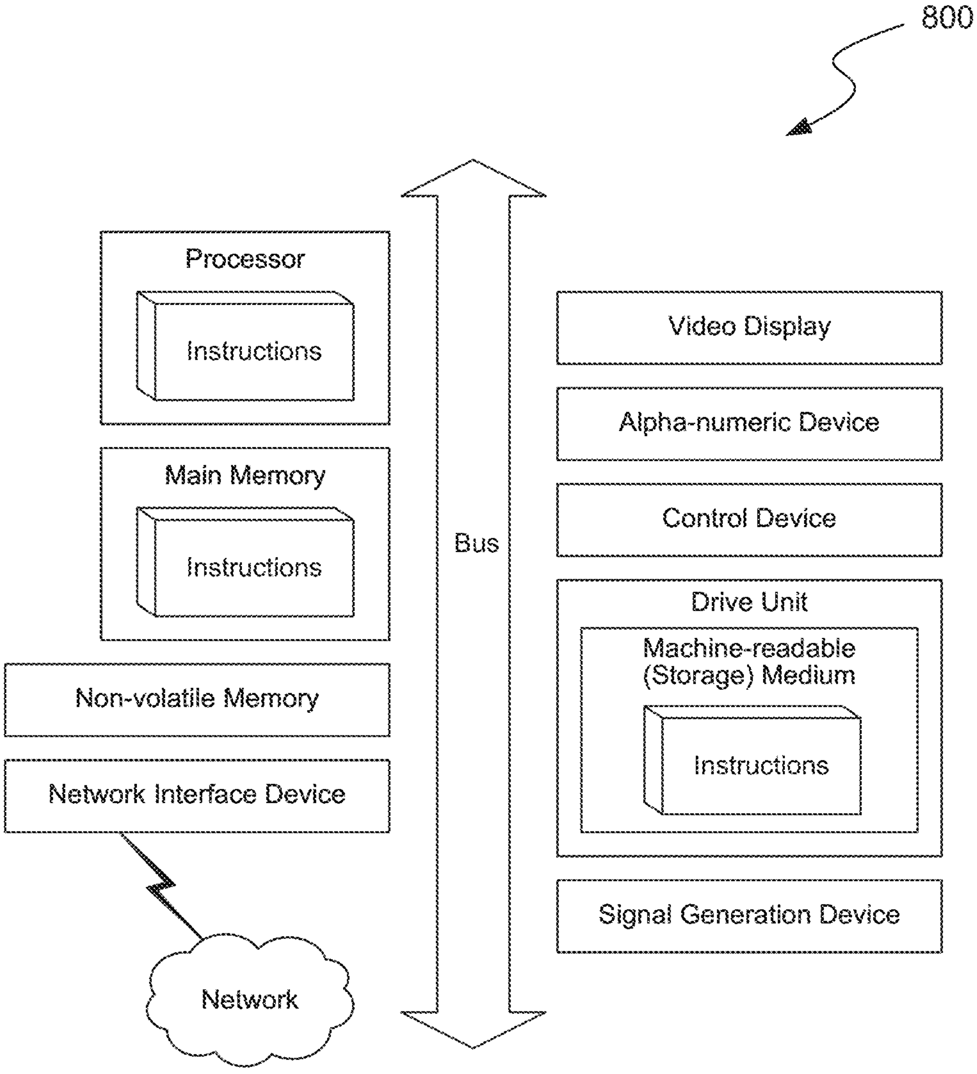
FIG. 8 is a diagrammatic representation of a machine in the example form of a computer system within which a set of instructions, for causing the machine to perform any one or more of the methodologies or modules discussed herein, may be executed.

FIG. 8 is a diagrammatic representation of a machine in the example form of a computer system 800 within which a set of instructions, for causing the machine to perform any one or more of the methodologies or modules discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components described in the example of FIGS. 1-7 (and any other components described in this specification) can be implemented. The computer system 800 can be of any applicable known or convenient type. The components of the computer system 800 can be coupled together via a bus or through some other known or convenient device.

This disclosure contemplates the computer system 800 taking any suitable physical form. As an example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or a Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or a network interface. It will be appreciated that a modem or network interface can be considered to be part of the computer system 800. The interface can include an analog modem, an integrated services digital network (ISDN) modem, a cable modem, a token ring interface, a satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “determining” or “displaying” or “generating” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a PDA, a cellular telephone, an iPhone, a BlackBerry, a processor, a telephone, a web appliance, a network router, switch, or bridge, or any machine capable of executing a set of instructions (sequential or otherwise) that specify actions to be taken by that machine.

While the machine-readable medium or machine-readable storage medium is shown in an exemplary embodiment to be a single medium, the terms “machine-readable medium” and “machine-readable storage medium” should be taken to include a single medium or multiple media (e.g., a centralized or distributed database, and/or associated caches and servers) that store the one or more sets of instructions. The terms “machine-readable medium” and “machine-readable storage medium” shall also be taken to include any medium that is capable of storing, encoding, or carrying a set of instructions for execution by the machine and that cause the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as “computer programs.” The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable-type media such as volatile and non-volatile memory devices, floppy and other removable disks, hard disk drives, and optical disks (e.g., Compact Disk Read-Only Memory (CD ROMS), Digital Versatile Disks, (DVDs), etc.), among others, and transmission-type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state from a binary one to a binary zero or vice versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

REMARKS

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An apparatus to control a plurality of eversion-based actuators comprising:

a pressurized chamber including an aperture to intake a fluid;

an eversion-based actuator in the plurality of eversion-based actuators including a reel of material expandable upon intaking the fluid;

a first valve coupled to the pressurized chamber and connecting the pressurized chamber to a first pressure source via the aperture, upon activation, the first valve to enable intake of the fluid into the pressurized chamber;

a second valve coupled to the pressurized chamber and connecting the pressurized chamber to a second pressure source via the aperture, a pressure of the fluid in the first pressure source exceeding a pressure of the fluid in the second pressure source, and upon activation, the second valve to enable outflow of the fluid from the pressurized chamber; and a passive retraction system exerting a retraction force on the reel of material causing the reel of material to shorten when the retraction force exceeds an expansionary force exerted by the fluid in the pressurized chamber.

2. The apparatus of claim 1, comprising:

a second pressurized chamber including a second aperture to intake a second fluid;

a second eversion-based actuator in the plurality of eversion-based actuators including a second reel of material expandable upon intaking the second fluid;

a third valve coupled to the second pressurized chamber and connecting the second pressurized chamber to a third pressure source via the second aperture, upon activation, the first valve to enable intake of the fluid into the pressurized chamber;

a fourth valve coupled to the second pressurized chamber and connecting the second pressurized chamber to a fourth pressure source via the second aperture, a pressure of the second fluid in the third pressure source exceeding a pressure of the second fluid in the fourth pressure source, upon activation, the fourth valve to enable outflow of the second fluid from the second pressurized chamber;

a second passive retraction system exerting a second retraction force on the second reel of material causing the second reel of material to shorten when the second retraction force exceeds a second expansionary force exerted by the second fluid in the second pressurized chamber; and a processor to independently control lengthening and shortening of the reel of material and lengthening and shortening of the second reel of material.

3. The apparatus of claim 1, comprising:

a first pressure regulator associated with the first pressure source, the first pressure regulator to estimate lengthening and shortening speed associated with the reel of material coupled to the first pressure regulator.

4. The apparatus of claim 1, comprising:

a volumetric flow meter to measure a volume of fluid associated with the pressurized chamber; and a processor to:

obtain an indication of the volume of fluid associated with the pressurized chamber, obtain a cross-section area associated with the reel of material, and determine a length of the eversion-based actuator based on the cross-section area associated with the reel of material and the indication of the volume of fluid associated with the pressurized chamber.

5. The apparatus of claim 1, wherein the passive retraction system includes a torsion spring or an angular spring.

6. An apparatus comprising:

a pressurized chamber including an aperture to intake a fluid;

an eversion-based actuator in a plurality of eversion-based actuators including a plurality of reels of material expandable upon intaking the fluid;

an activation mechanism to cause an expansion of a first multiplicity of reels of material in the plurality of reels of material;

a retraction mechanism to cause a retraction of a second multiplicity of reels of material in the plurality of reels of material; and wherein operation of the activation mechanism and operation of the retraction mechanism individually control a reel of material in the plurality of reels of material.

7. The apparatus of claim 6, wherein the activation mechanism comprises:

a first valve coupled to the pressurized chamber and connecting the pressurized chamber to a first pressure source via the aperture, upon activation, the first valve to enable intake of the fluid into the pressurized chamber.

8. The apparatus of claim 6, wherein the retraction mechanism comprises:

a second valve coupled to the pressurized chamber and connecting the pressurized chamber to a second pressure source via the aperture, upon activation, the second valve to enable outflow of the fluid from the pressurized chamber; and a passive retraction system exerting a retraction force on the reel of material causing the reel of material to shorten when the retraction force exceeds an expansionary force exerted by the fluid in the pressurized chamber.

9. The apparatus of claim 6, comprising:

a first valve coupled to the pressurized chamber and connecting the pressurized chamber to a first pressure source via the aperture, upon activation, the first valve to enable intake of the fluid into the pressurized chamber;

a second valve coupled to the pressurized chamber and connecting the pressurized chamber to a second pressure source via the aperture, a pressure of the fluid in the first pressure source exceeding a pressure of the fluid in the second pressure source, and upon activation, the second valve to enable outflow of the fluid from the pressurized chamber;

a passive retraction system exerting a retraction force on the reel of material causing the reel of material to shorten when the retraction force exceeds an expansionary force exerted by the fluid in the pressurized chamber;

a second pressurized chamber including a second aperture to intake a second fluid;

a second eversion-based actuator in the plurality of eversion-based actuators including a second reel of material expandable upon intaking the second fluid;

a third valve coupled to the second pressurized chamber and connecting the second pressurized chamber to a third pressure source via the second aperture, upon activation, the first valve to enable intake of the fluid into the pressurized chamber;

a fourth valve coupled to the second pressurized chamber and connecting the second pressurized chamber to a fourth pressure source via the second aperture, a pressure of the second fluid in the third pressure source exceeding a pressure of the second fluid in the fourth pressure source, and upon activation, the fourth valve to enable outflow of the second fluid from the second pressurized chamber;

a second passive retraction system exerting a second retraction force on the second reel of material causing the second reel of material to shorten when the second retraction force exceeds a second expansionary force exerted by the second fluid in the second pressurized chamber; and a processor to independently control lengthening and shortening of the reel of material and lengthening and shortening of the second reel of material.

10. The apparatus of claim 6, wherein the activation mechanism comprises:

a shaft bidirectionally rotatable around an axis;

a clutch selectively coupling the reel of material to the shaft, the clutch to allow free rotation of the shaft relative to the reel when the rotation of the reel is blocked, the clutch to allow rotational coupling between the reel of material and the shaft when the shaft is rotated in a first direction and the reel is free to rotate thereby expanding the reel of material when the shaft rotates in the first direction and the clutch rotationally couples the reel of material to the shaft, and the clutch to allow rotational coupling of the reel of material and the shaft when the shaft is rotated in a second direction and the reel is free to rotate, thereby contracting the reel of material when the shaft rotates in the second direction; and a motor connected to the shaft, the motor to bidirectionally rotate the shaft around the axis, operation of the motor rotating the shaft in the first direction to simultaneously expand a first multiplicity of eversion-based actuators in the plurality of eversion-based actuators.

11. The apparatus of claim 6, wherein the retraction mechanism comprises:

a shaft bidirectionally rotatable around an axis;

a clutch selectively coupling the reel of material to the shaft, the clutch to allow free rotation of the shaft relative to the reel when the rotation of the reel is blocked, the clutch to allow rotational coupling between the reel of material and the shaft when the shaft is rotated in a first direction and the reel is free to rotate thereby expanding the reel of material when the shaft rotates in the first direction and the clutch rotationally couples the reel of material to the shaft, and the clutch to allow rotational coupling of the reel of material and the shaft when the shaft is rotated in a second direction and the reel is free to rotate, thereby contracting the reel of material when the shaft rotates in the second direction;

a brake coupled to the reel of material, the brake to prevent unwinding of the reel of material when engaged; and a motor connected to the shaft, the motor to bidirectionally rotate the shaft around the axis, the operation of the motor rotating the shaft to simultaneously contract a second multiplicity of eversion-based actuators in the plurality of eversion-based actuators.

12. The apparatus of claim 6, comprising:

a shaft bidirectionally rotatable around an axis;

a first clutch selectively coupling a first eversion-based actuator in the plurality of eversion-based actuators to the shaft, the first clutch to:

the first clutch to allow free rotation of the shaft relative to the first reel when the rotation of the first reel is blocked, the first clutch to allow rotational coupling between the first reel of material and the shaft when the shaft is rotated in a first direction and the first reel is free to rotate thereby expanding the first reel of material when the shaft rotates in the first direction and the first clutch rotationally couples the first reel of material to the shaft, and the first clutch to allow rotational coupling of the first reel of material and the shaft when the shaft is rotated in a second direction and the first reel is free to rotate, thereby contracting the first reel of material when the shaft rotates in the second direction;

a first brake coupled to the first reel of material associated with the first eversion-based actuator, operation of the first brake to include a first mode and a second mode, the first mode to disengage the first brake from the reel of material, allowing the reel of material to rotate, and the second mode to engage the first brake with the reel of material, preventing the reel of material from rotating;

a second clutch selectively coupling a second eversion-based actuator in the plurality of eversion-based actuators to the shaft, the second clutch to:

the second clutch to allow free rotation of the shaft relative to the second reel when the rotation of the second reel is blocked, the second clutch to allow rotational coupling between the second reel of material and the shaft when the shaft is rotated in a first direction and the second reel is free to rotate thereby expanding the second reel of material when the shaft rotates in the first direction and the second clutch rotationally couples the second reel of material to the shaft, and the second clutch to allow rotational coupling of the second reel of material and the shaft when the shaft is rotated in a second direction and the second reel is free to rotate, thereby contracting the second reel of material when the shaft rotates in the second direction; and a second brake coupled to the second reel of material associated with the second eversion-based actuator, operation of the second brake to include a first mode and a second mode, the first mode to disengage the second brake from the reel of material, allowing the reel of material to rotate, and the second mode to engage the second brake with the reel of material, preventing the reel of material from rotating.

13. The apparatus of claim 6, wherein the activation mechanism comprises:

a shaft bidirectionally rotatable around an axis;

a clutch selectively coupling the reel of material to the shaft, the clutch to rotationally couple the reel of material to the shaft; and a motor connected to the shaft, the motor to bidirectionally rotate the shaft around the axis, operation of the motor rotating the shaft in a first direction to simultaneously expand a first multiplicity of eversion-based actuators in the plurality of eversion-based actuators.

14. The apparatus of claim 6, wherein the retraction mechanism comprises:

a shaft bidirectionally rotatable around an axis;

a clutch selectively coupling the reel of material to the shaft, the clutch to decouple the reel of material from the shaft;

a brake coupled to the reel of material, the brake to prevent unwinding of the reel of material when engaged; and a motor connected to the shaft, the motor to bidirectionally rotate the shaft around the axis, the operation of the motor rotating the shaft to simultaneously contract a second multiplicity of eversion-based actuators in the plurality of eversion-based actuators.

15. The apparatus of claim 6, comprising:

a shaft bidirectionally rotatable around an axis;

a clutch selectively coupling the reel of material to the shaft, the clutch to include a first mode and a second mode, the first mode to rotationally couple the reel of material to the shaft, and the second mode to decouple the reel of material from the shaft;

a brake coupled to the reel of material, the brake to prevent unwinding of the reel of material when engaged, the operation of the brake to include a first mode and a second mode, the first mode to disengage the brake from the reel of material, allowing the reel of material to rotate, and the second mode to engage the brake with the reel of material, preventing the reel of material from rotating;

a motor connected to the shaft, the motor to bidirectionally rotate the shaft around the axis, operation of the motor rotating the shaft in a first direction to simultaneously expand a first multiplicity of eversion-based actuators in the plurality of eversion-based actuators, the clutch and operation of the brake to determine whether the eversion-based actuator expands with rotating the shaft in the first direction, and the operation of the motor rotating the shaft in a second direction opposite the first direction to simultaneously contract a second multiplicity of eversion-based actuators in the plurality of eversion-based actuators; and a processor to:

set the brake to operate in the second mode, thereby preventing the reel of material from rotating upon intaking the fluid, and cause the pressurized chamber to intake the fluid.

16. A method comprising:

providing a pressurized chamber including an aperture to intake a fluid;

providing an eversion-based actuator in a plurality of eversion-based actuators including a reel of material expandable upon intaking the fluid;

providing a first valve coupled to the pressurized chamber and connecting the pressurized chamber to a first pressure source via the aperture, upon activation, the first valve to enable intake of the fluid into the pressurized chamber;

providing a second valve coupled to the pressurized chamber and connecting the pressurized chamber to a second pressure source via the aperture, a pressure of the fluid in the first pressure source exceeding a pressure of the fluid in the second pressure source, and upon activation, the second valve to enable outflow of the fluid from the pressurized chamber; and providing a passive retraction system exerting a retraction force on the reel of material causing the reel of material to shorten when the retraction force exceeds an expansionary force exerted by the fluid in the pressurized chamber.

17. The method of claim 16, comprising:

providing a second pressurized chamber including a second aperture to intake a second fluid;

providing a second eversion-based actuator in the plurality of eversion-based actuators including a second reel of material expandable upon intaking the second fluid;

providing a third valve coupled to the second pressurized chamber and connecting the second pressurized chamber to a third pressure source via the second aperture, upon activation, the first valve to enable intake of the fluid into the pressurized chamber;

providing a fourth valve coupled to the second pressurized chamber and connecting the second pressurized chamber to a fourth pressure source via the second aperture, a pressure of the second fluid in the third pressure source exceeding a pressure of the second fluid in the fourth pressure source, and upon activation, the fourth valve to enable outflow of the second fluid from the second pressurized chamber;

providing a second passive retraction system exerting a second retraction force on the second reel of material causing the second reel of material to shorten when the second retraction force exceeds a second expansionary force exerted by the second fluid in the second pressurized chamber; and providing a processor to independently control lengthening and shortening of the reel of material and lengthening and shortening of the second reel of material.

18. The method of claim 16, comprising:

providing a first pressure regulator associated with the first pressure source, the first pressure regulator to estimate lengthening and shortening speed associated with the reel of material coupled to the first pressure regulator.

19. The method of claim 16, comprising:

providing a volumetric flow meter to measure a volume of fluid associated with the pressurized chamber; and providing instructions to:

obtain an indication of the volume of fluid associated with the pressurized chamber, obtain a cross-section area associated with the reel of material, and determine a length of the eversion-based actuator based on the cross-section area associated with the reel of material and the indication of the volume of fluid associated with the pressurized chamber.

20. The method of claim 16, wherein the passive retraction system includes a torsion spring or an angular spring.

* * * * *